United States Patent [19]

Kato et al.

[11] Patent Number: 5,742,144
[45] Date of Patent: Apr. 21, 1998

[54] BACKLASH COMPENSATION METHOD FOR SEMI-CLOSED-LOOP TYPE SERVO CONTROL

[75] Inventors: Tetsuaki Kato, Hadano; Kokoro Hatanaka, Oshino-mura, both of Japan

[73] Assignee: Fanuc Ltd., Minamitsuru-gun, Japan

[21] Appl. No.: 593,336

[22] Filed: Jan. 29, 1996

[30] Foreign Application Priority Data

Feb. 2, 1995 [JP] Japan .................................. 7-035924

[51] Int. Cl.$^6$ .................................................. G05B 11/01
[52] U.S. Cl. .................. 318/630; 318/569; 318/632; 318/601
[58] Field of Search ........................ 318/630, 632, 318/633, 560, 567, 569, 600–1, 568.22

[56] References Cited

U.S. PATENT DOCUMENTS

| | | | |
|---|---|---|---|
| 4,890,046 | 12/1989 | Kurakake et al. | 318/630 |
| 4,904,915 | 2/1990 | Kurakake | 318/615 |
| 4,916,375 | 4/1990 | Kurakake et al. | 318/630 |
| 4,961,034 | 10/1990 | Kakino et al. | 318/600 |
| 5,059,881 | 10/1991 | Fujita et al. | 318/630 |
| 5,101,146 | 3/1992 | Teshima | 318/572 |
| 5,204,602 | 4/1993 | Iwashita | 318/630 |
| 5,440,218 | 8/1995 | Oldenkamp | 318/701 |
| 5,467,004 | 11/1995 | Matsuo et al. | 318/807 |
| 5,587,635 | 12/1996 | Watanabe et al. | 318/434 |
| 5,598,077 | 1/1997 | Matsubara et al. | 318/568.22 |

*Primary Examiner*—David S. Martin
*Attorney, Agent, or Firm*—Staas & Halsey

[57] ABSTRACT

A method for properly compensating for a backlash between a servomotor and a machine moving part, such as a table, driven by the servomotor in a semi-closed-loop type control. In the semi-closed-loop type servo control, the force of a motor-driven table which acts on a motor is estimated by means of a disturbance observer, the side of the groove of a ball nut directly connected to the table, with which the ridge of the ball thread directly connected to the motor is in contact, is detected by the sign of the value of the estimated force, and the direction of backlash compensation is changed in accordance with the detected result.

7 Claims, 5 Drawing Sheets

BACKLASH COMPENSATION METHOD FOR SEMI-CLOSED-LOOP TYPE SERVO CONTROL

BACKGROUND OF THE INVENTION

1. Field of the Invention

The present invention relates to a method for properly compensating for a backlash between a servomotor and a machine moving part, such as a table, driven by means of the servomotor in semi-closed-loop type servo control.

2. Description of the Related Art

The momentary speed and position of a servomotor which is used in an NC control servo mechanism are detected by means of a speed sensor and a position sensor, and the servomotor is controlled by feeding back the detected information to a control device. A semi-closed-loop type servo mechanism obtains the motor position from the motor side or motor-shaft or by detecting the rotational angle of a ball thread, and does not directly detect a machine moving part, such as a table, itself.

In the case of the semi-closed-loop type servo system, a certain amount of deviation (backlash) tends to occur as to the positional relationship between the motor (the ball thread directly connected to the motor) and the table (the ball nut directly connected to the table) due to the dimensional errors and shaping errors of the power transmission sections, and this causes the deviation within a certain amount as to the relationship between the detected position of the motor and the actual position of the table. Thus, in order to make the table reach within the range of the backlash from the predetermined position, the position of the motor needs to be compensated by the amount of the backlash. Conventionally, for this purpose, the direction of the backlash compensation is changed in accordance with the direction of a command speed (command movement per unit time) of the motor.

FIG. 7 shows an example of the semi-closed-loop type servo mechanism for the backlash compensation according to prior art. A value obtained by adding a backlash compensation value outputted from a backlash compensation block 2 to a deviation between a position command from an information processing circuit (not shown) and a position feedback from a motor position sensor (not shown) is delivered to a speed control loop (not shown).

The position command is delivered to a feedforward block 1, whereupon it is subjected to feedforward processing.

When the servomotor M starts to decelerate at a certain point of time while it is moving in the direction of arrow X, thereby driving the table T in the same direction, as shown in FIG. 3(a), the servomotor M and the table T will have a positional relation I or II. In case of relation I, the state before the deceleration is maintained as it is, and the servomotor M and the table T move together in the same direction in a manner such that the table T is pushed by the servomotor M. FIG. 3(b) shows this state. In case of relation II, on the other hand, the deceleration of the table T will not exceed that of the servomotor M, so that the State of FIG. 3(c) in which the table T moves within the backlash is followed by the state of FIG. 3(d). For some time after this, the servomotor M and the table T move together in the same direction (direction indicated by arrow X) in a manner such that the table T pushes the servomotor M.

The relation I is a case in which the friction of a power transmission system leading to the table T is relatively large. In this case, the deceleration of the table exceeds that of the motor, so that the table will not move faster than the motor. In case of the relation II, on the other hand, the friction of the power transmission system to the table is relatively small, so that the deceleration of the table cannot be higher than that of the motor.

In some cases, there may be a difference equivalent to a backlash Bp between the respective positions of the motor M and the table T even though the table T and the motor M move in the same direction, as described above. It is to be understood, however, that the backlash Bp of this type cannot be compensated by means of backlash compensation means (shown in FIG. 7) which is used in the semi-closed-loop type servo mechanism and changes the direction of backlash correction in accordance with the direction of the command speed.

OBJECT AND SUMMARY OF THE INVENTION

The object of the present invention is to provide a backlash compensation method, in which the state of engagement between a servomotor and a machine moving part, such as a table, driven by means of the motor is estimated, and backlash correction corresponding to the estimated state of engagement is duly effected, in a semi-closed-loop type servo mechanism which does not directly detect the position of the machine moving part itself.

In order to achieve the above object, according to the present invention, the direction of the force of a machine moving part which is driven by a servomotor, which acts on the servomotor, is estimated, and the direction of backlash compensation is changed in accordance with the direction of the force. The direction of the force of the machine moving part acting on the servomotor is estimated by means of a disturbance observer which estimates the magnitude of the force as a disturbance.

BRIEF DESCRIPTION OF THE DRAWINGS

The foregoing and other objects and feature of the invention will become apparent from the following description of preferred embodiments of the invention with respect to the accompanying drawings, in which.

DETAILED DESCRIPTION OF THE PREFERRED EMBODIMENTS

Figure 1:
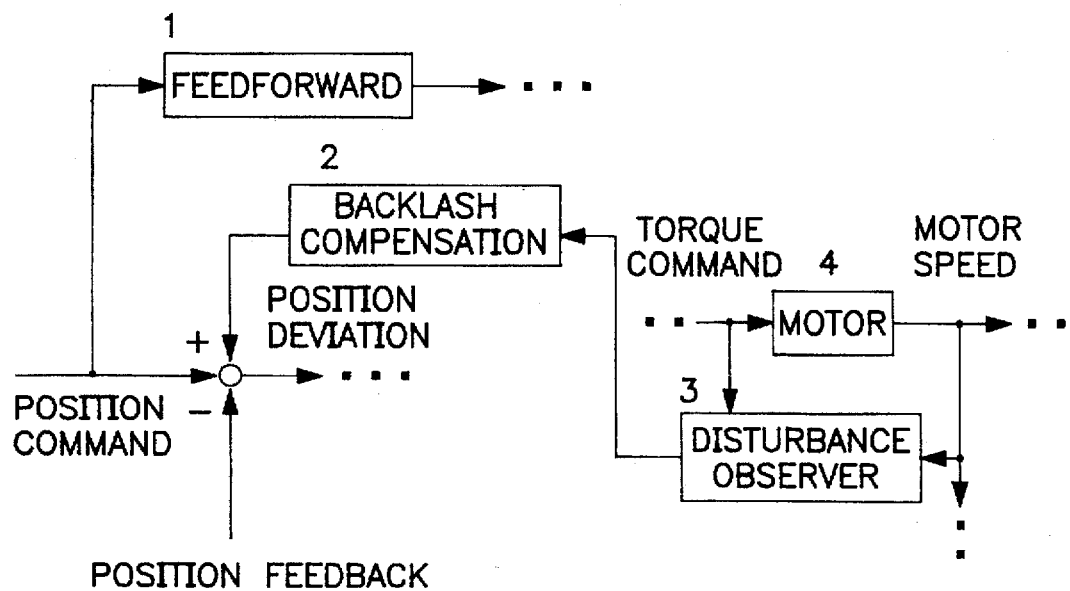
FIG. 1 is a control block diagram used in carrying out a backlash compensation method for semi-closed-loop type servo control according to the present invention.

FIG. 1 shows a backlash compensation means peculiar to the present invention which is incorporated in a conventional semi-closed-loop type servo control mechanism in order to carry out one embodiment of a backlash compensation method according to the invention.

In the servo mechanism shown in FIG. 1, as in the conventional semi-closed-loop type servo control mechanism (see FIG. 7), a position command is subjected to feedforward processing, the sum of a backlash compensation and the difference between the position command and a position feedback is delivered to a speed control loop (not shown), a servomotor is driven in accordance with a torque command obtained from the speed control loop to detect the actual speed of the servomotor, and the position of the servomotor is obtained in accordance with the detected speed and is fed back.

The difference between the present invention and the prior art lies in the kind of signal by which the direction of the backlash compensation is changed. That is, according to the prior art, the direction of the backlash compensation is changed in accordance with the direction (positive or negative) of the command speed. According to the present invention, however, the direction of backlash compensation is changed in accordance the output of an observer which is incorporated in the servo mechanism. The following is a description of the embodiment which represents features of the invention.

According to the present embodiment, as shown in FIG. 1, the servo mechanism comprises a disturbance observer 3 which receives the torque command and motor speed as inputs and estimates a disturbance acting on the motor. The disturbance estimated by the observers is an external force which is applied to the motor by a machine moving part, such as a table, linked to the motor. The direction (positive or negative) of this external force provides information of which side of the groove of a ball nut (or a gear) directly linked to the table is in contact with the ridge of a ball thread (or an actuator) directly linked to the motor.

Figure 3A:
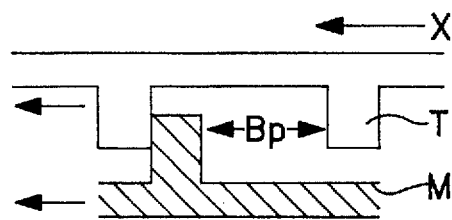
FIGS. 3(a), 3(b), 3(c) and 3(d) are diagrams for illustrating the relative positions of a motor and a table when the motor is decelerated while driving the table.
Figure 3B:
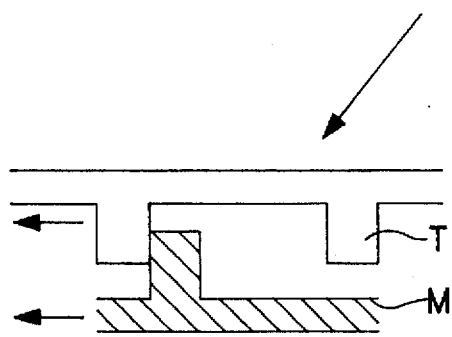
Figure 3C:
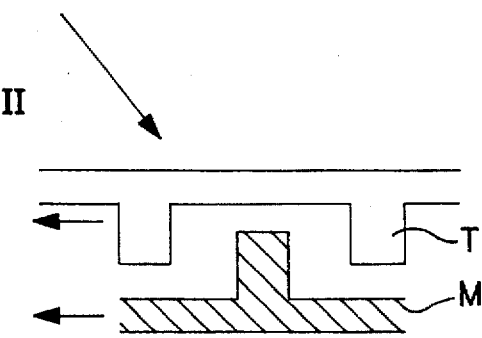

When the ball thread and the ball nut, which are connected directly to the motor M and the table T, respectively, are in engagement with each other in the manner shown in FIG. 3(b), the table T applies a rightward force (in the direction opposite to the direction of arrow X) to the motor M. When the ball thread and the ball nut are in engagement in the manner shown in FIG. 3(d), on the other hand, the table T applies a leftward force (in the direction of arrow X) to the motor M.

Accordingly, the disturbance observer 3, which detects the force of the table T acting on the motor M as a disturbance, gives information of which side of the groove of a ball nut (or a gear) directly connected to the table is in contact with the ridge of a ball thread (or an actuator).

Figure 2:
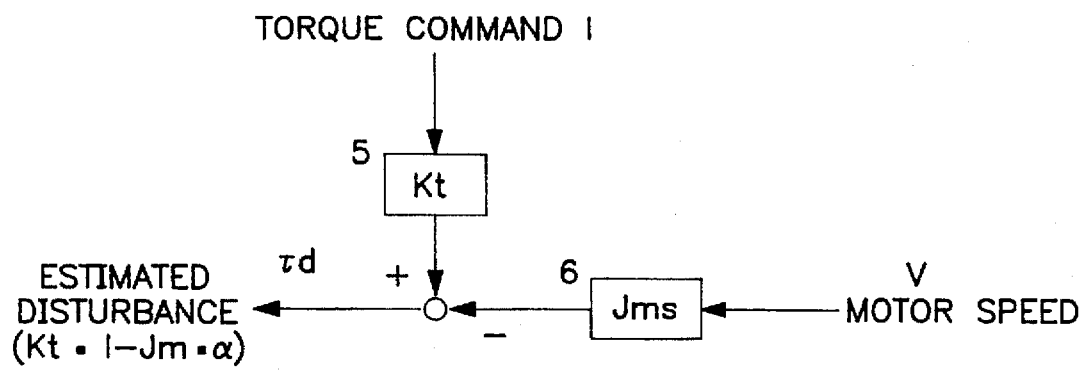
FIG. 2 is a block diagram showing an example of a disturbance observer used in the control of FIG. 1.

FIG. 2 is a block diagram showing an example of the disturbance observer used in the present embodiment. If the torque command applied to the motor and the detected actual speed of the motor are I and v, respectively, an estimated disturbance $\tau d$ is given as:

$$\tau d = I * Kt - \dot{v} * Jm,$$

where $\dot{v}$ is a differential value (i.e., acceleration) obtained by differentiating v by time, Kt is a torque constant, and Jm is a rotor inertia.

Figure 3D:
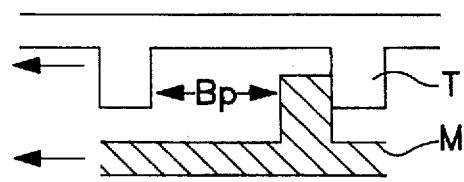

If it is assumed that a state of engagement between the ball thread (M) and the ball nut (T) of FIG. 3(b) is established when the estimated disturbance $\tau d$ is positive, then a state of engagement between the ball thread and the ball nut of FIG. 3(d) will be established when the estimated disturbance $\tau d$ is negative.

The sign (positive or negative) of the value of the output of the disturbance observer, that is, the sign of the estimated disturbance $\tau d$, is inputted to the backlash compensation means 2. Thereupon, the backlash compensation means 2 delivers a backlash compensation value corresponding to the direction specified by the input so that the compensation value is added to a position deviation.

Figure 4:
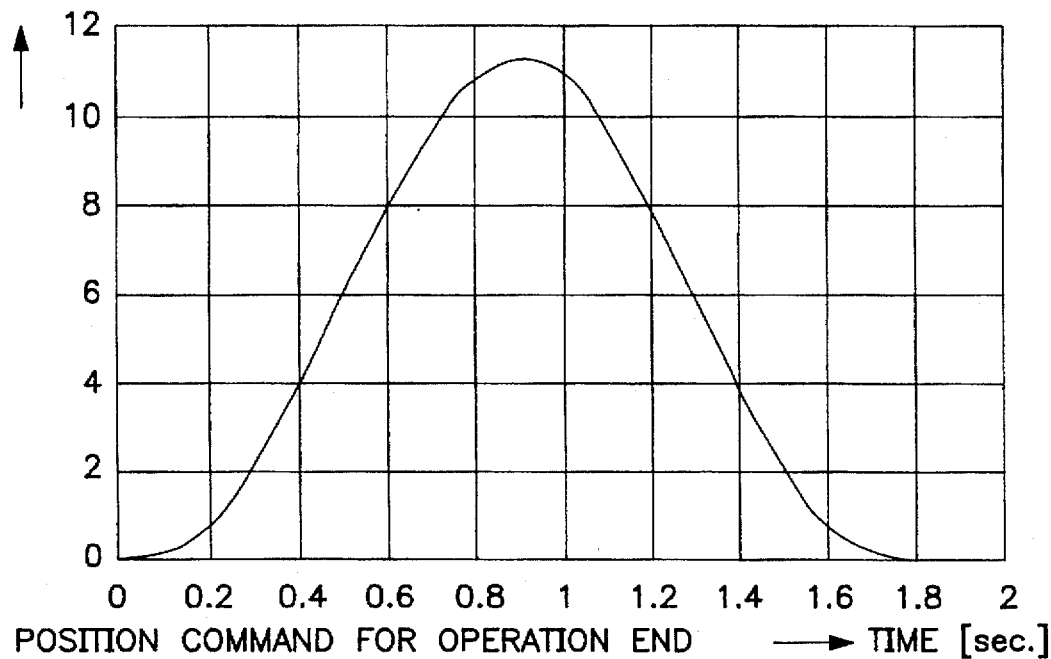
FIG. 4 shows a position command for the operation end.

Referring now to FIGS. 4 to 8, an example of the backlash compensation according to the present invention will be described. According to this example, a backlash of 0.10 rad (in terms of the motor position) exists between the motor and the operation end. FIG. 4 shows a position command for the operation end. The operation end is subjected to a static friction of 8.3 kgf·cm and a dynamic friction of 2.5 kgf·cm in terms of the motor torque. The inertia of the operation end is 0.32 kgfcm·S$^2$ in terms of the motor torque. A spring of 310 kgf·cm/rad and a damper of 0.56 kgf·cm(rad/s) (in terms of the motor torque) are provided between the motor and the operation end.

Figure 5:
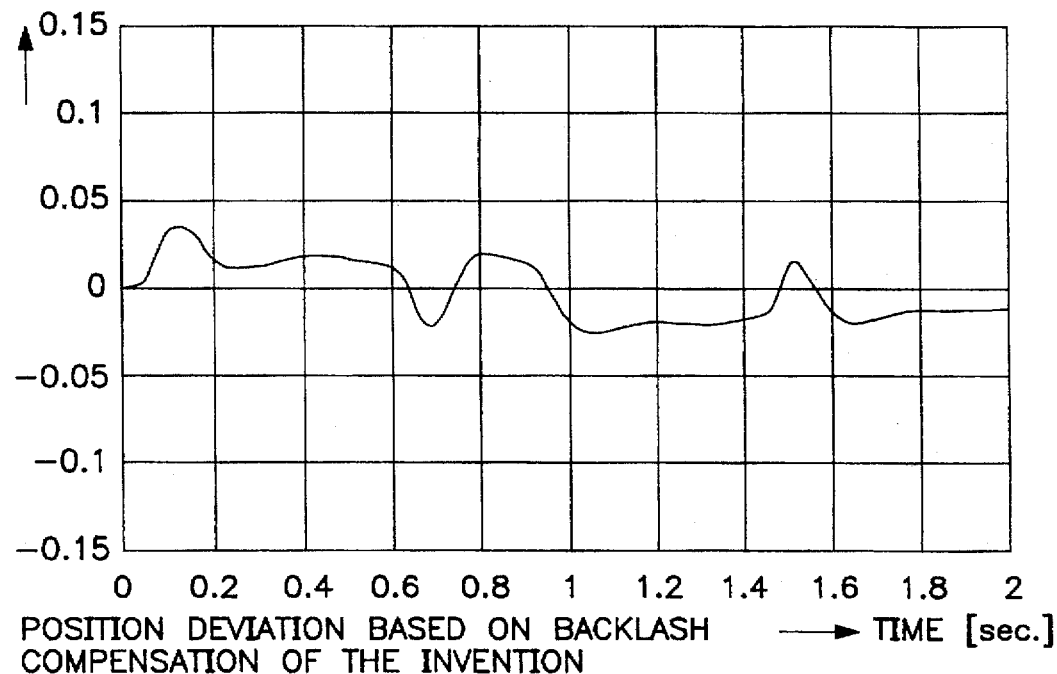
FIG. 5 shows position deviation data of the operation end obtained when the position command of FIG. 4 is subjected to backlash compensation according to an embodiment of the present invention.
Figure 6:
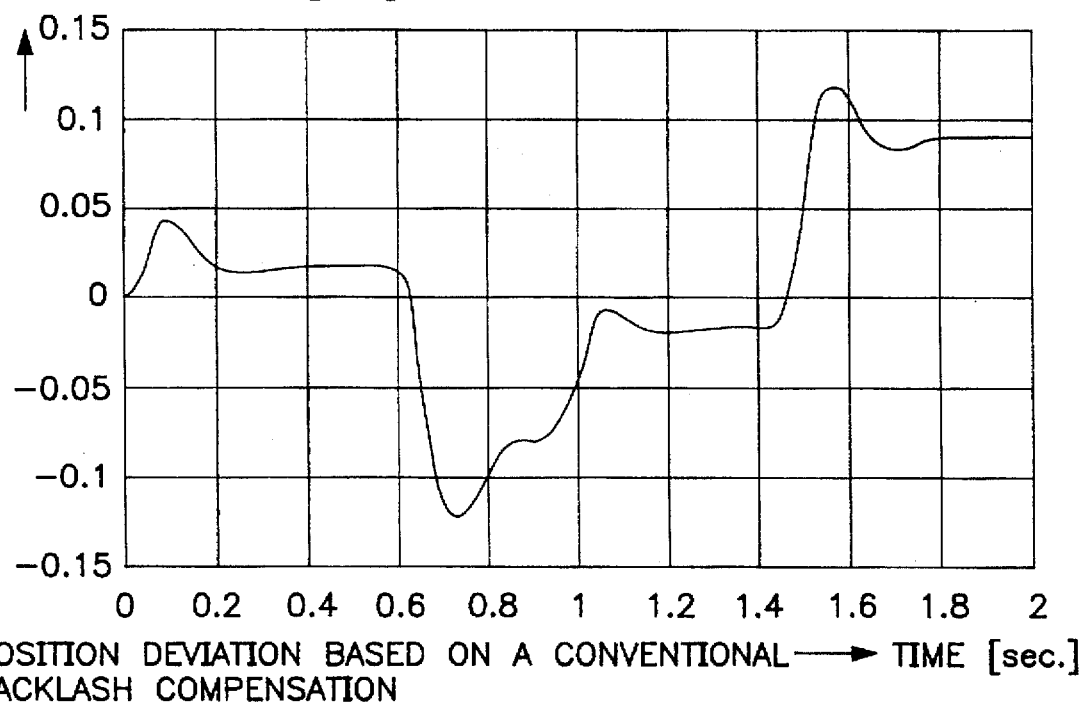
FIG. 6 shows position deviation data of the operation end obtained when the position command of FIG. 4 is subjected to a conventional backlash compensation.
Figure 7:
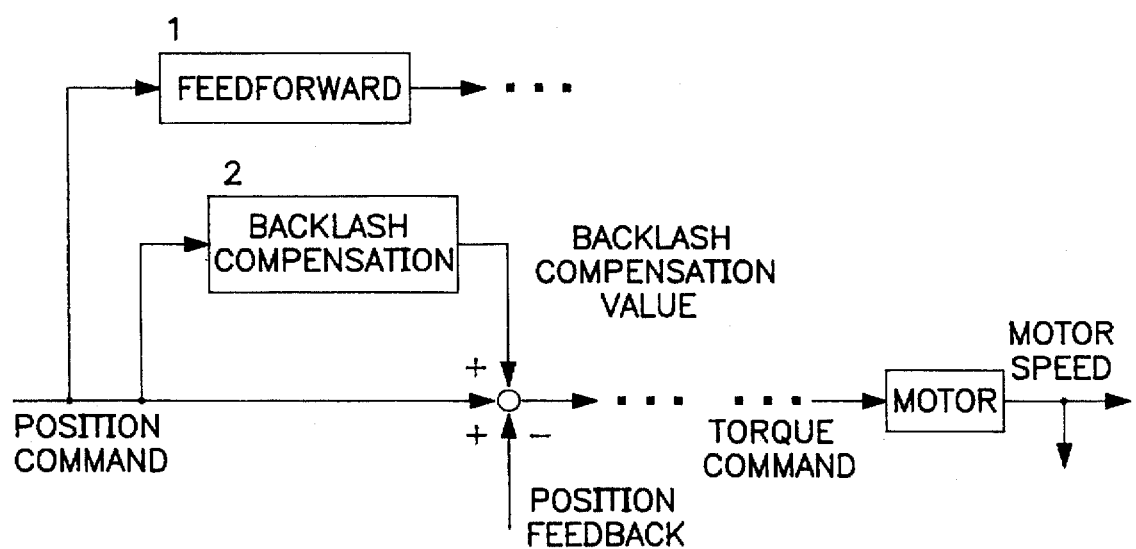
FIG. 7 is a control block diagram used in carrying out a conventional backlash compensation method for semi-closed-loop servo control.

FIG. 5 shows the deviation between the command position and operation end position obtained when the backlash compensation according to the present invention is effected under the above-described conditions, while FIG. 6 shows the deviation between the command position and operation end position obtained when the conventional backlash compensation shown in FIG. 7 is effected. A comparison between FIGS. 5 and 8 indicates that a constant result can always be obtained without causing any large deviation between the position of the motor and the operation end when the backlash compensation is made according to the present invention.

According to the present invention, as described above, the force of the table T acting on the motor M is estimated according to the following steps:

(1) estimating the force of the table T acting on the motor M;

(2) based on the sign of the estimated force (that is, direction of the force), determining which side of the groove of a ball nut (or a gear) directly connected to the table is in contact with the ridge of a ball thread (or an actuator); and (3) based on the above determination, changing the direction of the backlash compensation.

The force (external force) of the table T which acts on the motor M can be also obtained by solving the equation of motion of the mechanical section. However, this calculation is possible on condition that dynamic parameters of the mechanical parts and a load attached to the operation end, non-linear characteristics of friction or viscosity, etc., can be accurately specified in advance. Accordingly, this calculation is considerably complicated, and real-time computation would require a processor having a considerably large computational capacity.

According to the present invention, however, the force of the table T which acts on the motor M can quickly be detected as a disturbance by means of the disturbance observer, so that appropriate backlash compensation can be enjoyed in a real-time fashion, depending on the state of engagement between the members on the side of the motor and the members on the side of the table.

What is claimed is:

1. A backlash compensation method for semi-closed-loop type servo control, comprising the steps of:

estimating a disturbance acting on a motor, using a disturbance observer, in response to receiving a torque command and a motor speed of the motor; and compensating for the backlash in accordance with the estimated disturbance, including changing a direction of backlash compensation in accordance with a sign of the estimated disturbance.

2. A backlash compensation method for semi-closed-loop type servo control according to claim 1, wherein said step of estimating a disturbance comprises the step of obtaining the estimated disturbance $$\tau d = I*Kt - \dot{v}*Jm,$$

where I is the torque command, v is the motor speed, $\dot{v}$ is a value obtained by differentiating v by time, Kt is a torque constant, and Jm is a rotor inertia.

3. A method for compensating for backlash between a motor and a machine moving part in a semi-closed-loop type servo control, comprising the steps of:

estimating a disturbance acting on the motor by the machine moving part based upon a torque command and motor speed of the motor; and determining a backlash compensation value based upon the estimated disturbance; and determining a sum of the backlash compensation value and a difference between a position command and a position feedback;

transmitting the sum to a speed control loop, and determining the torque command from the speed control loop.

4. The method as claimed in claim 3, wherein the step of estimating a disturbance further comprises using a disturbance observer to estimate the disturbance.

5. The method as claimed in claim 3, wherein a direction of the disturbance is indicative of which side of a ball nut directly linked to the machine moving part is in contact with a ball thread directly linked to the motor.

6. The method as claimed in claim 3, wherein a direction of the disturbance is indicative of which side of a groove of a gear directly linked to the machine moving part is in contact with an actuator directly linked to the motor.

7. The method as claimed in claim 3, wherein the step of determining a backlash compensation comprises the step of changing a direction of the backlash compensation in accordance with a sign of the estimated disturbance.

* * * * *

UNITED STATES PATENT AND TRADEMARK OFFICE
CERTIFICATE OF CORRECTION

PATENT NO. : 5,742,144

DATED : April 21, 1998

INVENTOR(S) : Kato et al.

It is certified that error appears in the above-identified patent and that said Letters Patent is hereby corrected as shown below:

Col. 1, line 59, "State" should be --state--.

Col. 2, line 14, "correction" should be --compensation--.

Col. 3, line 33, "observers" should be --observer 3--.

Col. 4, line 36, "8" should be --6--.

Signed and Sealed this

Twenty-ninth Day of September, 1998

Attest:

BRUCE LEHMAN

Attesting Officer

Commissioner of Patents and Trademarks